Feb. 24, 1931.  N. C. PICKARD  1,794,202
AIRSHIP
Filed March 1, 1930   3 Sheets-Sheet 1

Inventor
Nathan C. Pickard.
Attorney

Feb. 24, 1931.                N. C. PICKARD                1,794,202
                                 AIRSHIP
                      Filed March 1, 1930    3 Sheets-Sheet 2
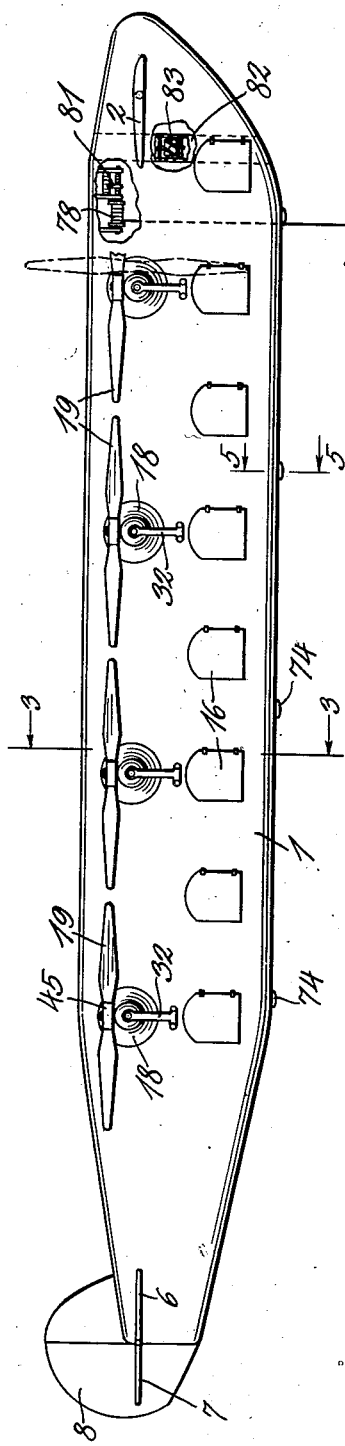
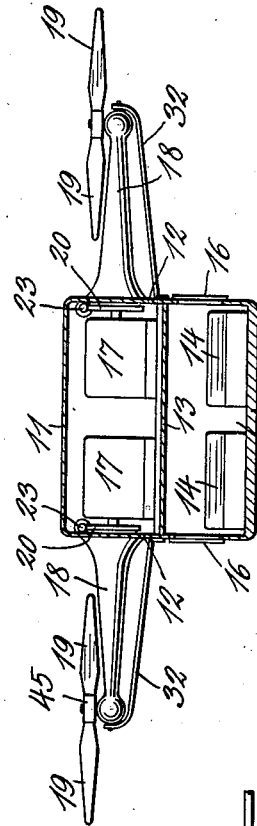
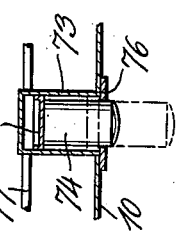
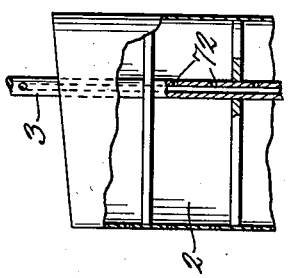
Inventor
Nathan C. Pickard.
By A. J. O'Brian
                    Attorney Feb. 24, 1931.     N. C. PICKARD     1,794,202
AIRSHIP
Filed March 1, 1930     3 Sheets-Sheet 3
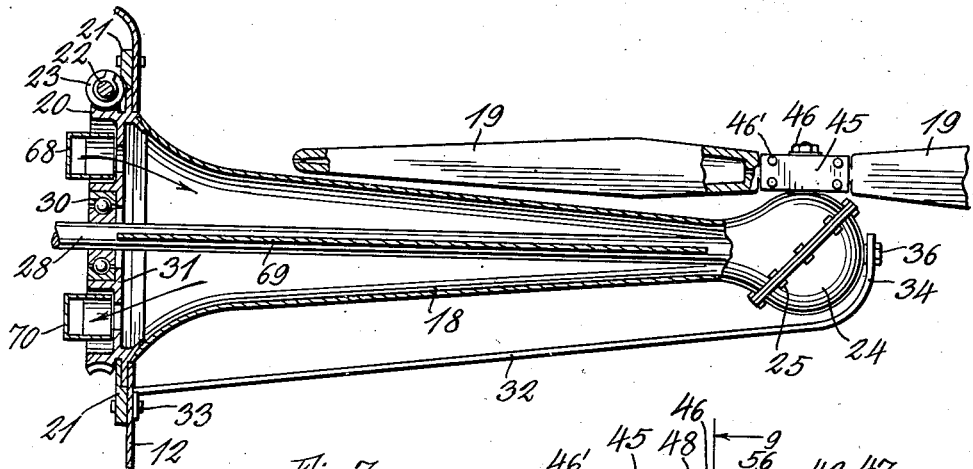
Fig. 7.
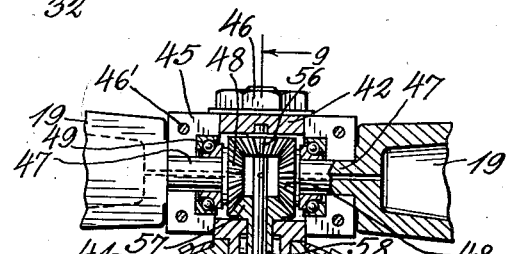
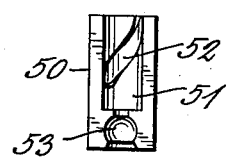
Fig. 10.
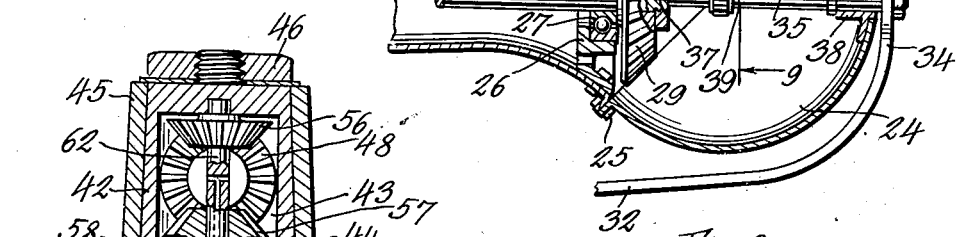
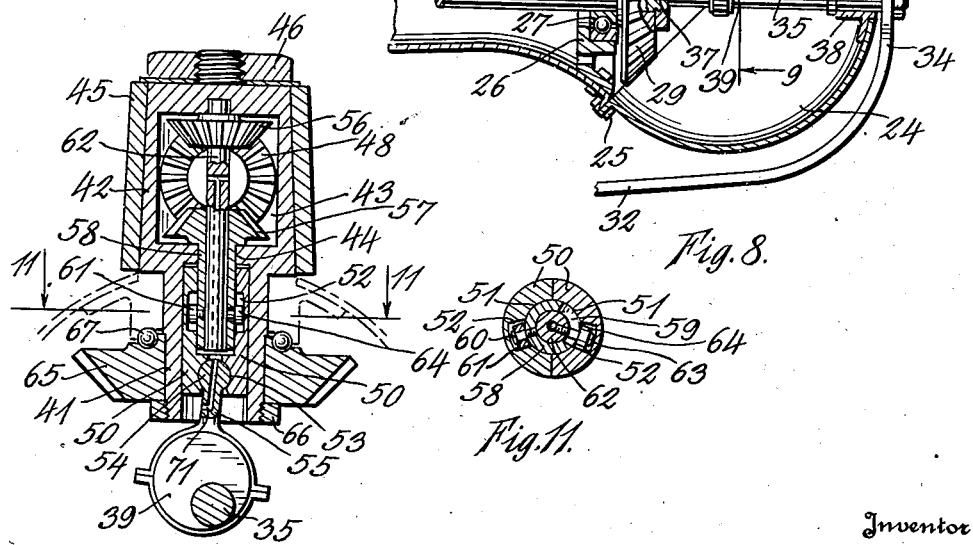
Fig. 8.
Fig. 11.
Fig. 9.
Inventor
Nathan C. Pickard.
By A. S. O'Brien
Attorney Patented Feb. 24, 1931

1,794,202

UNITED STATES PATENT OFFICE

NATHAN C. PICKARD, OF DENVER, COLORADO

AIRSHIP

Application filed March 1, 1930. Serial No. 432,533.

This invention relates to improvements in airships and has reference more particularly to airships of the heavier than air type.

It is the object of this invention to produce an airship of such construction that it can rise vertically and which can also be landed in a vertical direction whereby it is possible to take off from very small landing fields.

Another object of this invention is to produce an airship that can land on water as well as on land and which can be landed on rough surfaces or on smooth surfaces, and which is so constructed that it will float on the surface of the water like an ordinary ship.

A further object is to produce an airship of the heavier than air type that does not require large wing surfaces and which is therefore capable of attaining very high speed.

A still further object of this invention is to produce an airship of such construction that the power is obtained from a large number of separate motors one or more of which can be disconnected while the airship is in flight whereby repairs can be made to the motor without interfering with the operation of the ship.

Another object of this invention is to produce a ship of such construction that it can be turned on a short radius and which can be readily maintained at any desired altitude.

A still further object is to produce a ship that shall have means for preventing the accumulation of sleet and snow and which will therefore be especially well adapted for use in such parts of the world as are subject to sleet and snowstorms. The means for guarding against the accumulation of sleet and snow and the fact that the ship can land on and depart from small rough fields makes it especially well adapted for use in arctic explorations.

The above and other objects that may appear as this description proceeds are attained by means of a construction and an arrangement of parts that will now be described in detail, reference for this purpose being had to the accompanying drawings in which the preferred embodiment of the invention has been illustrated, and in which:

Fig. 2 is a side elevation of the ship, portions being broken away to disclose some features of the construction;

Fig. 3 is a transverse section taken on line 3—3, Fig. 2;

Fig. 4 is a view of a portion of a wing showing means for heating the interior thereof to prevent the accumulation of sleet and snow;

Fig. 5 is a section taken on line 5—5, Fig. 2, and shows one of the pneumatic landing supports;

Fig. 6 is a view showing the relative inclination of the propellers when the ship is in flight;

Fig. 7 is a section taken on line 7—7, Fig. 1, showing one of the rotatable propeller brackets, portions being shown in section;

Fig. 8 is a section through the outer end of the propeller supporting bracket and shows the means for rotating the propeller and for automatically changing the pitch of the propeller blade;

Fig. 9 is a section taken on line 9—9, Fig. 8;

Fig. 10 is a view showing the interior of one of the semi-cylindrical parts that are employed for turning the propeller blades; and Fig. 11 is a section taken on line 11—11, Fig. 9.

Figure 1:
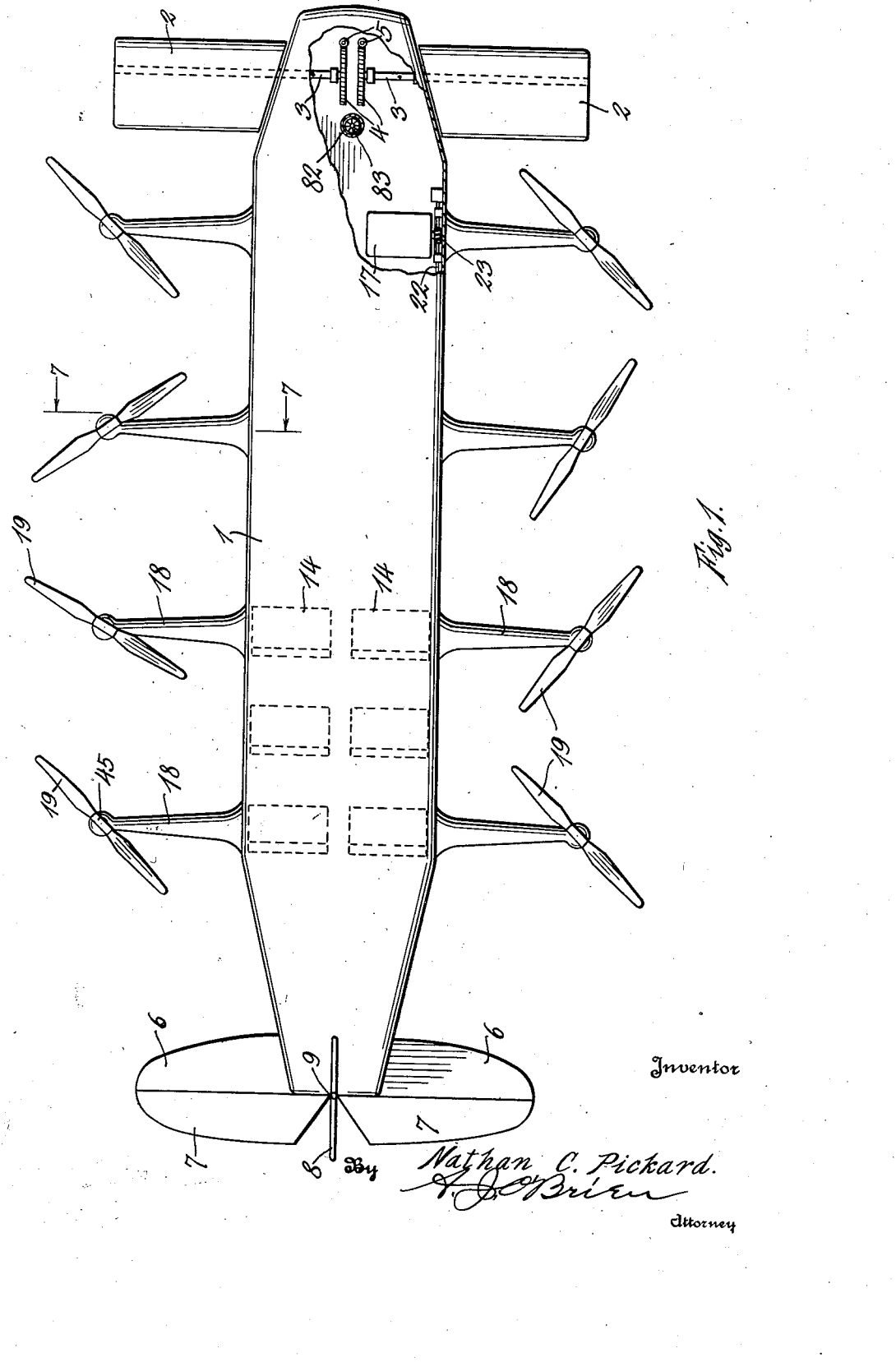
Fig. 1 is a top plan view of my improved air ship, a portion being broken away to better disclose the construction.

In the drawings reference numeral 1 represents the hull of the airship. Secured to the front end and extending outwardly from opposite sides of the hull are two wings or elevators that have been designated by reference numeral 2. These wings are secured to hollow tubular supports 3 that are mounted for rotation and to the inner ends of which worm wheels 4 are attached. Cooperating with each worm wheel is a worm 5 that is driven by means of an electric motor or by means of power derived from the engines. By rotating the worm wheels the inclination of the wings can be changed in order to get the most desirable results. Secured to the rear of the hull are two horizontal stabilizers 6, to which the elevators 7 are attached. A rudder 8 is pivoted at 9 and the rudder and elevators are controlled by some suitable mechanism which has not been illustrated, as any of the ordinary means for controlling similar parts now in use can be employed. The airship has been illustrated as being provided with a hull having a substantially rectangular cross section like that shown in Fig. 3, but the exact shape of the hull is immaterial and it might be constructed with a circular cross section if desired. The bottom of the hull has been designated by reference numeral 10 and the top by reference numeral 11, while the two sides have been indicated by reference numeral 12. The interior of the hull is divided into an upper and a lower compartment by means of a partition 13. The lower compartment is for the accommodation of passengers or freight and has been illustrated as provided with two rows of seats 14 that are separated by a passageway 15. The side walls are provided with a plurality of openings, each of which is closed by a door 16. These doors are so constructed that when they are closed, they form a water tight joint with the sides and therefore when the ship is floating on the surface of the water, it can be submerged to a point above the openings in the sides without danger of water entering the interior. The compartment above the partition 13 contains the motors 17 that supply the power.

Extending laterally from opposite sides of the hull are tubular brackets 18 to the outer ends of which propellers having blades 19 are secured. The brackets or propeller housings 18 are outwardly tapered in the manner shown in Fig. 7 and are provided at their inner ends with circular worm gears 20 and are mounted for rotation in bearings 21. A shaft 22 extends the entire length of the ship and is provided with a worm 23 for each of the worm gears 20. When the shaft 22 is rotated all of the propeller housings will be simultaneously rotated through the same angle. The outer ends of the housings are enlarged and formed with a removable cap 24 that is fastened to the stationary part by means of bolts 25. When the cap 24 is in place the outer end forms a substantially spherical compartment like that shown in Figs. 7 and 8. Secured to the interior of the housings near their outer ends ars supporting members 26 that serve as supports for ball bearings 27 in which the shafts 28 are mounted. The outer end of each shaft is provided with a bevelled gear 29 and the inner end of each shaft is supported in a ball bearing 30 carried by the transverse member 31 of the housing. Each shaft 28 is connected with one of the motors and is rotated when the motor is in operation. A brace member 32 has its inner end secured at 33 to the side of the hull and has its outer end turned upwardly as indicated at 34. A shaft 35 is secured to the upper end of the curved portions 34 and is held in place by means of a nut 36. The inner end of shaft 35 terminates in a part 37 of reduced diameter that is located in an opening in the outer end of shaft 28. Shaft 35 is held stationary with respect to the brace 32 and the part 24 is provided with a bearing 38 with which the shaft 35 cooperates in the manner shown in Fig. 8. Each shaft 35 is provided with an eccentric 39 that is held against rotary movement on the shaft. A bearing 40 is secured to the upper portion of the outer end of each propeller housing and is provided with an opening through which the hollow shaft 41 extends. A conical portion 42 extends from the upper end of the shaft 41 and is formed integral with the latter. The part 42 is provided with an opening 43 that communicates with the opening in shaft 41 through a hole 44. A propeller hub 45 is secured to the tapered portion 42 and held in place thereon by means of a nut 46. The hub is formed of two parts of substantially the same shape and which are held together by means of bolts 46'. The propeller blades 19 are provided with root portions 47 that extend through openings in the outer ends of the hub arms. The inner end of each root portion is provided with a bevel gear 48 with which a thrust bearing 49 cooperates. Within the opening in shaft 41 a two-part sleeve is mounted. This sleeve consists of two semi-cylindrical portions 50 which, when assembled form a cylindrical sleeve. Each member 50 has a semi-cylindrical opening 51 that is provided with a spiral groove 52. The lower end of each member 50 is also provided with a semi-spherical recess 53, which is adapted to receive the spherical head 54 of the connecting rod 55. The other end of connecting rod 55 is provided with a two-part bearing that encircles the cam 39 of the corresponding shaft 35. Located within the opening 43 and operatively connected with the bevelled gears 48, are two bevel pinions 56 and 57. Pinion 57 is provided with a tubular hub 58 that extends through the opening 44 and terminates within the cylindrical opening 51 in the movable sleeve formed from the two semi-cylindrical members 50. Hub 58 is provided on one side with an opening 59 and is provided on the opposite side with a pin 60 on which a roller 61 is mounted. This roller is located within one of the helical slots 52. A shaft 62 is secured to the bevelled pinion 56 and extends downwardly through the interior of the tubular hub 58. A pin 63 is secured to shaft 62 and carries a roller 64 that cooperates with the slot 52 in the other member 50. It is now apparent that if the sleeve formed from parts 50 is moved longitudinally within the opening in shaft 41, it will rotate pinion 56 in one direction and pinion 57 an equal amount in the opposite direction, and since these pinions are operatively connected with the bevelled gears 48 that are secured to the propeller blades 19, the latter will be rotated in opposite directions so as to alter their pitch. A bevelled gear 65 is secured to the lower end of the tubular shaft 41 and is held in place by means of a nut 66. Balls 67 separate the upper surface of gear 65 from the lower end of bearing 40 and serve as a thrust bearing. When shaft 28 is rotated, the propeller will be rotated in a corresponding direction as the motion is transmitted from shaft 28 to the propeller by means of gears 29 and 65. Attention is called to the fact that shaft 35 is stationary with respect to the bracket 32 and consequently with respect to the hull of the ship and therefore, when the propeller housing is rotated by means of the worm 23 the propeller will rotate about the axis of shaft 35.

Each shaft 35 carries an eccentric 39 that is held against rotation on the shaft, and each eccentric is connected with the movable sleeve comprising parts 50 by means of a connecting rod 55. These eccentrics are so arranged that when the propellers are in the full line position shown in Fig. 2, the axes of shafts 62 will pass through the centers of the eccentrics and the centers of shafts 35, or, in other words, the sleeves 50 will be at their uppermost position. Let us now assume that the housings 18 are rotated in a clockwise direction from the position shown in full lines in Fig. 2 towards the position shown in dotted lines. As soon as the housings begin to rotate the propellers will move about the axes of shafts 35 and the action of the eccentrics will then move the sleeves downwardly at a rate depending on the eccentricity of the eccentrics. The eccentrics are of different eccentricity and the ones connected with shafts 35 that are located nearest the front of the ship is smaller than the ones connected with the shafts located to the rear, while the eccentrics connected with the rearmost pair of shafts is the greatest. It will be apparent that when the housings are rotated the pitch of the blades is altered in an amount depending on the relative movement of the sleeves 50 with respect to the tubular shaft 41, and the latter is dependent upon the eccentricity of the eccentrics, therefore, if the propeller blades have all the same pitch when located in the manner shown in Fig. 2, the pitch of the blades will be changed as the housings are rotated in such a way that propellers near the front will have the smallest pitch and those near the rear the largest pitch in the manner shown in Fig. 6. The reason for changing the relative pitch of the propellers is to compensate for the difference in the speed of the air as it is evident that the velocity of the air relative to the ship will be increased by the action of the propellers as it passes from the front to the rear of the ship.

I want to call particular attention to the means I have just described which automatically changes the pitch of the propeller blades when the housings are rotated as, for the purpose of which these propellers are used, this is a very important adjustment which I believe to be entirely new in this art.

Secured to the inner ends of the housings are manifolds 68 that are connected with the exhaust pipes from the motors and the exhaust gases are therefore forced into the propeller housings and since the latter are provided with longitudinal partitions 69, the gases will be compelled to travel the entire length of the housings and to leave through the manifold 70. These hot gases will prevent the accumulation of sleet and snow on the housings. From Fig. 9 it will be seen that openings 71 have been provided through the connecting rods 55 and through the shafts 62, for the purpose of permitting exhaust gases to pass from the housings into and through the interiors of the propeller blades. The purpose of passing exhaust gases through the blades is to heat the latter so that sleet and snow will not adhere to them. When steam is employed for power instead of gasoline engines, live steam can be passed through the blades instead of the exhaust gases or the gases of combustion can be substituted for the exhaust gases and the same results produced. It is also contemplated to make the walls of the airship double and to pass heated gases between the two walls for the purpose of keeping the outer surface at such a temperature that ice will not form thereon.

In Fig. 4 I have shown the tubular shafts 3 as provided with openings 72. The object of these openings is to permit heated gases to be delivered to the inside of the wings to prevent snow and ice from adhering to the wings.

In Fig. 5 I have shown a cross section through one of the pneumatic buffers employed in landing. It is contemplated to provide the bottom of the airship with several cylinders 73 that are open at their bottom and within which is mounted cylindrical supports 74. The upper ends of the supports 74 are provided with leather cups 75 that form airtight connections between the walls of the cylinders. Plates 76 limit the downward movement of the members 74. When the ship is to be landed, compressed air is introduced into the cylinders through the pipes 77 and move the plungers downwardly to the dotted line position. When the ship lands the plungers can move so as to adjust themselves to unequalities in the surface and since they are supported by compressed air, they serve as springs to cushion the shock in landing and since the plungers are independently movable and are all acted upon by air pressure, they can move different distances downwardly and in this way the ship can be landed on uneven surfaces and still be supported in horizontal position.

In the drawing and in the description, the propellers have been shown as having one pair of blades only, but they can be made with three or a greater number of blades if desired as the mechanism shown in Figs. 8 and 9 can readily be adapted for use with any number of blades.

Let us now assume that the ship is standing on the ground or on some other supporting surface and that it is desired to rise into the air. The engines are started and the propellers are rotated in a horizontal plane like that shown in Figs. 1 and 2. All of the power of the propellers will then be exerted for the purpose of lifting the ship and after the ship has left the ground and attained a safe elevation, the propeller housings are rotated so as to tilt the axes, about which the propellers are rotating, forwardly. The tilting of the propellers produces a force which has two components, one of which operates in a vertical direction and the other of which operates in a horizontal direction and serves to move the ship forwardly. When the propellers have been adjusted so that the vertical components are just sufficient to hold the ship at a given elevation, it will travel forwardly due to the horizontal component of the force. As the speed increases the stabilizers or wings 2 and 6 become effective for the purpose of supporting and stabilizing the ship and the propellers can then be rotated still farther so as to increase the horizontal components and thereby increase the speed. As the speed increases the lifting force exerted by the stabilizers also increases, thereby making it possible to still further rotate the propeller housings and still further increase the speed of the ship.

When the propellers are in the position shown in Figs. 2 and 3, the pitch of the blades should be the same so that the several propellers will exert the same lifting force when rotated at the same speed. When the propellers are rotated about the axes of the propeller housings, they will increase the velocity of the air relative to the ship and the air that strikes the propeller to the rear of any of the other propellers must act on air that has a greater relative velocity and therefore in order to equalize the effect of the different propellers, the pitch of the blades must be altered to compensate for the increased velocity of the air. The pitch of the blades must increase towards the rear and therefore the front propellers have the smallest pitch, while the rear propellers have the greatest pitch. This alteration of the pitch is effected by the mechanism shown in Figs. 8 and 9 and which has already been described. By varying the eccentricities of the eccentrics 39 and by varying their diameters any proportional change of pitch can be obtained automatically as the propellers are rotated about the axes of the propeller housing.

In order to control the action of the ship in landing, I have provided a mechanism comprising a reel 78 on which is wound a cable 79 to the lower end of which a housing 80 is attached. This housing may be provided with lights for illuminating the landing place and may also be large enough to contain an observer who is in communication with the pilot of the airship by means of telephone and which can therefore direct the landing. The reel 78 is spring operated so as to automatically wind the slack in the cable onto the reel and as this reel rotates, an indicator 81 is moved over a scale for the purpose of indicating the exact distance from the bottom of the ship to the ground. The pilot by observing the indicator 81 is in position to control the machinery so as to land the ship gently on the supporting surface. For use in determining whether the ship is rising or falling, I have produced an indicator which consists of a tube 82 that passes through the hull of the ship from top to bottom and which is provided on its interior with a rotatable wheel 83 having spiral ribs and which will therefore rotate at a speed that depends on the difference in the air pressure between the top and the bottom of the hull. The rotation of wheel 83 is communicated to a suitable pointer by a mechanism not shown.

Owing to the fact that this ship is not provided with large wings, it offers less resistance than the ordinary aeroplanes and is therefore capable of obtaining very high speeds, which is one of the advantages of this construction. The rotation of the propeller housing can be effected by suitable control levers so that the pilot can rotate the propeller housings on the two sides of the ship independently and in this way the ship can be turned on a short radius by the simple expedient of increasing the horizontal component of the force, exerted by the propellers, faster on one side than on the other.

This airship is especially well adapted to take off from and land on the decks of ships, or the tops of buildings, such as post office buildings or railway stations, and in this manner a large amount of time can be saved in the handling of mail which, under present conditions, must be transported many miles to the airports that are usually located outside of the cities.

The gasoline or other fuel may be stored in tanks under the seats in the passenger compartment.

From the above description it will be apparent that I have produced an airship of such construction that it can rise vertically from the ground and can move forwardly in a straight line or in a curved path and which can be landed on a very small surface due to the fact that by adjusting the propellers so that they all rotate in a horizontal plane, the ship can be gently lowered without any longitudinal movement and it is therefore well adapted for use in places where large landing fields are not available.

Due to the fact that the propellers produce the sustaining and the propelling force, the use of large wing surfaces can be dispensed with, thereby reducing the air resistance to a minimum.

Having described the invention what is claimed as new is:

1. An airship having an elongated fuselage, a plurality of propellers mounted for rotation about substantially parallel axes that are parallel with a vertical plane extending in the direction of the fuselage and means for simultaneously rotating the axes of the propellers about horizontal axes and for simultaneously altering the pitch of the propellers.

2. An airship having an elongated hull provided on opposite sides with outwardly extending brackets, a propeller secured to the outer end of each bracket and rotatable about an axis that is perpendicular to the axis of the bracket, means for simultaneously turning all of the brackets on each side of the ship, the brackets on one side being turned independently of the brackets on the other side and means for altering the pitch of the propeller blades when the brackets are rotated.

3. In an airship, in combination, an elongated fuselage, a plurality of propeller brackets extending outwardly from opposite sides thereof and mounted for rotation about their longitudinal axes, a drive shaft extending centrally through each bracket, means for simultaneously turning all of the brackets on each side of the ship through the same angle, a bearing secured to the outer end of each bracket, the axis of the bearing being substantially perpendicular to the drive shaft, a propeller rotatably mounted in the bearing, means for transmitting motion from the drive shaft to the propeller, braces having one end secured to the side of the fuselage and the other end rotatably connected with the outer ends of the brackets by means of a shaft that extends inwardly into the bracket, an eccentric carried by the shaft, a connecting rod associated with the eccentric and means associated with the connecting rod for changing the pitch of the propellers when the brackets are rotated with respect to the eccentrics.

4. An airship comprising, in combination, an elongated fuselage, which is divided by a horizontal partition into an upper and a lower compartment, engines located in the upper compartment hollow brackets extending outwardly from the fuselage opposite each engine, the brackets being mounted for rotation about their longitudinal axes, a shaft rotatably mounted in each bracket, a propeller secured to the outer end of each bracket, said propellers being provided with blades and rotatable about axes that are substantially perpendicular to the drive shaft, means for transmitting motion from the drive shaft to the propellers, means for turning the brackets, and means for changing the pitch of the propeller blades when the brackets are turned.

5. An airship comprising, in combination, an elongated fuselage, which is divided by a horizontal partition into an upper and a lower compartment, engines located in the upper compartment hollow brackets extending outwardly from the fuselage opposite each engine, the brackets being mounted for rotation about their longitudinal axes, a shaft rotatably mounted in each bracket, a propeller secured to the outer end of each bracket, said propellers being provided with blades and rotatable about axes that are substantially perpendicular to the drive shaft, means for transmitting motion from the drive shaft to the propellers, means for turning the brackets, and means for changing the pitch of the propeller blades when the brackets are turned, said last named means including an eccentric and means for holding the eccentric stationary with respect to the fuselage when the brackets are turned.

In testimony whereof I affix my signature.

NATHAN C. PICKARD.